United States Patent Office 3,234,005
Patented Feb. 8, 1966

3,234,005
THIXOTROPIC SLURRY FERTILIZER
Donald J. Smalter, Deerfield, Foster Crampton, Evanston, and Marvin B. Gillis, Glenview, Ill., assignors to International Minerals & Chemical Corporation, a corporation of New York
No Drawing. Filed Oct. 5, 1962, Ser. No. 228,764
3 Claims. (Cl. 71—29)

The present invention generally relates to a novel slurry fertilizer. In a specific aspect the invention relates to a novel fertilizer comprising a slurry of ammoniated triple superphosphate and muriate of potash in a nitrogen solution.

As is well known, phosphorus, potassium and nitrogen are essential plant nutrients and large tonnages of phosphorus, potassium and nitrogen compounds are provided in commercial fertilizers. The fertilizer must not only provide these plant nutrients, but they must be provided in available form, that is the phosphorus, potassium and nitrogen compounds must be relatively soluble in the soil fluids so that they may be assimilated by the growing plant.

Solid fertilizers have been used for many years. In recent years the liquid mixed fertilizer industry has taken over a greater portion of the fertilizer market. However, because of the solubility characteristics of the ingredients used in the preparation of liquid mixed fertilizers the total plant nutrient composition of liquid fertilizers is limited to about 30%. Further, when liquid mixed fertilizers are cooled, solids frequently form in the solution which may clog distribution lines and these solids may only dissolve slowly upon subsequent heating of the solution. Furthermore, it is not generally economical to ship liquid fertilizers for long distances from the plant because of the high water content.

More recently slurry fertilizers, sometimes denominated suspension fertilizers, have been prepared and used successfully. Slurry fertilizers are fluid fertilizers comprising an admixture of small particles of fertilizer ingredient and a liquid. The fertilizer ingredients used in slurry fertilizers need not be highly purified but may contain insoluble impurities. Slurry fertilizers, therefore, have the advantage of being able to utilize lower cost raw materials, as compared to liquid fertilizers. Further, since slurry fertilizers are not limited by solubility characteristics, slurry fertilizers may contain a relatively high percentage of plant nutrients.

Prior to the present invention, when preparing slurry fertilizers it was considered necessary to use phosphoric acid as the liquid ingredient in order to obtain a sufficiently high concentration of nitrogen, phosphorus and potassium in the final slurry fertilizer composition. The use of phosphoric acid therefore continued in slurry fertilizers despite difficult handling, formulating and corrosion problems that attended its use. The present invention is in part based on the discovery that good slurry fertilizers may be prepared from solid sources of phosphorus plant nutrient, namely acidulated phosphate rock.

Accordingly, it is an object of the present invention to provide a novel slurry fertilizer.

It is a further object of the invention to provide a novel slurry fertilizer which utilizes a solid phase phosphorus source.

It is a specific object of the present invention to provide a novel process for preparing a fertilizer material from finely divided triple superphosphate, potassium chloride, and ammonia.

These and other objects and advantages of the present invention will be apparent from the description of the invention.

The following definitions of terms used in the specification and claims are given to facilitate a complete understanding of the present invention.

DEFINITIONS

Superphosphate: A term generally applied to the product obtained by treating finely ground phosphate rock with sulfuric acid. It is sometimes also called regular superphosphate or ordinary superphosphate. Phosphate rock is predominantly tricalcium phosphate and when it is treated with sulfuric acid the tricalcium phosphate is converted into a mixture of calcium sulfate and hydrated monocalcium orthophosphate. The analysis is usually between about 16 to 20 percent $P_2O_5$ although it may be higher or lower.

Triple superphosphate: A concentrated phosphate manufactured in a process similar to that used for preparing ordinary superphosphate except that phosphoric acid is utilized in place of sulfuric acid. In the manufacture of triple superphosphate, finely ground phosphate rock is mixed with phosphoric acid in predetermined proportions. The resultant mass is permitted to set up and is cured in large storage piles. The main phosphate ingredient in triple superphosphate is hydrated monocalcium orthophosphate. Triple superphosphate generally contains from 45 to 50% of available $P_2O_5$ although it may be lower or higher and some material of from 52% to 57% available $P_2O_5$ is currently being marketed.

Direct application: The application of a fertilizer raw material to the soil without blending or reacting it with any other fertilizer raw material.

Liquid fertilizer: A nearly neutral mixed fertilizer containing at least two primary plant nutrients, and containing no appreciable amount of undissolved fertilizer materials except that it may contain flocculent iron and aluminum phosphates.

Nitrogen solution: A water solution containing at least two of the following sources of nitrogen: ammonia, urea and ammonium nitrate. Nitrogen solution manufacturers in the U.S.A. have agreed on a system to describe the solution. For example, N soln. 453 (31–0–43). The number 453 defines the total nitrogen content (45.3%) of the solution. The numbers inside the parentheses are percentages of ammonia, ammonium nitrate and urea. These percentages are correct to the nearest whole number. The percent water is determined by subtracting the sum of the numbers inside the parentheses from 100. The system cannot be used to define percentages of sodium nitrate, ammonium sulfate, carbon dioxide or formaldehyde, which are also sometimes components of nitrogen solutions.

Supplemental nitrogen: That part of the nitrogen in a fertilizer which is not furnished by the free ammonia that reacts with the phosphate or phosphoric acid.

Nitric superphosphate: The reaction product of nitric acid and phosphate rock. May be a solid, paste or slurry.

Bone phosphate of lime: Commonly abbreviated to BPL, is generally used to express the phosphate content of fertilizers. This is the equivalent of $Ca_3(PO_4)_2$. In the anaylsis of phosphates, the chemist generally reports the phosphorus contents in terms of phosphorus pentoxide ($P_2O_5$).

Generally described, the present invention is a novel fertilizer composition comprising a slurry of ammoniated finely divided acidulated phosphate rock in a nitrogen-containing aqueous liqiuid.

In a more specific aspect the present invention is a novel fertilizer composition comprising a slurry of ammoniated finely divided triple superphosphate and potassium chloride in a nitrogen solution.

In a further specific aspect the present invention is a novel process for preparing a slurry fertilizer composition which comprises admixing triple superphosphate fines and finely divided muriate of potash with an aqueous ammonia-urea-ammonium nitrate solution, in proportions to obtain a flowable slurry.

Phosphate rock is relatively insoluble in soil fluids and the phosphorus in the rock is, therefore, available to plants only at an extremely slow rate. It is chiefly for this reason that phosphate rock is first acidified with a strong mineral acid, such as sulfuric acid, phosphoric acid and/or nitric acid, to convert the phosphorus into more water soluble compounds such as exist in superphosphate and triple superphosphate before application to the soil. The phosphorus plant nutrient has also been applied to the soil as phosphoric acid and slurry fertilizers have heretofore utilized phosphoric acid as the liquid medium or carrier. It is, however, genereally more expensive to apply phosphorus to soil as phosphoric acid than as superphosphate or triple superphosphate on the basis of equivalent amounts of phosphorus applied. The present invention is in part based on the discovery that slurry fertilizers may be efficiently prepared from acidulated phosphate rock and liquid sources of nitrogen.

The acidulated rock utilized in the present invention may be any suitable acidulated phosphate rock. Superphosphate and triple superphosphate are specifically preferred forms of acidulated phosphate rock to be used in the present invention. Ntiric superphosphate may also be used.

The acidulated phosphate rock is used in finely divided form. It is preferably at least 90% of −14 mesh particle size. More preferably it is at least 90% −14 mesh and at least 50% −35 mesh particle size. When necessary, comminution of acidulated phosphate rock to such a finely divided state may be effected in any suitable manner. Such finely divided acidulated phosphate rock is also commercially available and is usually recovered from run-of-pile triple superphosphate by a sizing operation such as, inter alia, screening or air classification. The substantially −35 mesh material is frequently denominated triple superphosphate fines and is specifically preferred.

In general, the acidulated phosphate rock, preferably triple superphosphate and/or ordinary superphosphate, is used in amounts of at least 1% by weight of the resulting slurry fertilizer composition and more generally in amount of from about 5% to about 50% by weight of the fertilizer slurry composition. The specific amount used, of course, depends upon the desired $P_2O_5$ content of the final slurry fertilizer composition and the desired constistency or viscosity of the slurry.

Any suitable substantially water-soluble potassium compound may be used as the source of the potassium plant nutrient. As hereinbefore set forth, the compounds used in slurry fertilizers need not be as highly refined as those used in solution fertilizers but may contain insoluble impurities. Agricultural grade potash materials are eminently suitable for use in the invention although more refined or purer material may be used if desired. Muriate of potash (KCl) is a specifically preferred potash salt. Potassium sulfate may also be used and is preferred when it is desirable that the fertilizer be relatively low in chloride content. Potassium sulfate-magnesium sulfate double salts may also be used and are specifically preferred when magnesium is desired in the slurry fertilizer composition. Potassium nitrate may be used, although it is not a preferred compound because of its tendency to form large crystals.

The potassium plant nutrient should be used in relatively finely divided form although semi-granular material may be used. −14 mesh grade material is preferred; −20 mesh material is more preferred; −28 mesh material is specifically preferred. The potassium nutrient may be supplied by one or more potassium compounds.

The potassium nutrient is preferably used in the slurry composition of the present invention, although it need not be present. When used, it is in amount of at least 1% by weight and more generally in amount of from about 5 to about 50% by weight of the fertilizer slurry composition. The specific amount used, of course, depends upon the desired $K_2O$ content of the final slurry fertilizer composition.

The nitrogen-containing liquid used in the present invention may be ammonia or a nitrogen solution containing ammonia. The nitrogen plant nutrient source used in preparing the fertilizer of this invention is preferably ammonia and a nitrogen solution containing urea and/or ammonium nitrate. The nitrogen solution may provide the ammonia to ammoniate the acidulated phophate rock as well as supplemental nitrogen. Urea and ammonium nitrate are preferred sources of supplemental nitrogen. Water solutions of ammonia-urea, ammonia-ammonium nitrate or ammonia-urea-ammonium nitrate may be used to ammoniate and neutralize the triple superphosphate and to supply supplemental nitrogen. So-called direct application nitrogen solutions may be used in the present invention.

Ammonia is a relatively low cost source of nitrogen and it is preferred to use as much ammonia in the fertilizer composition as is practical under the fertilizer distribution conditions contemplated. The ammonia used in the practice of the present invention may be anhydrous liquid ammonia or aqueous ammonia. Higher ammonia concentrations in aqueous ammonia are preferred so as to maintain a high total nitrogen content in the slurry fertilizer composition although lower concentrations may be used if desired. In general, it is preferred that the aqueous ammonia contain at least 10% by weight ammonia and more preferably at least 15% by weight ammonia. The upper limit of concentration is, of course, essentially anhydrous ammonia. When anhydrous ammonia is used or whenever the pressure of the ammonia in the composition is greater than atmospheric, sufficient pressure is, of course, maintained on the material to prevent loss of ammonia before it is applied to the soil.

The nitrogen solution used provides the supplemental nitrogen and may also provide the ammonia which reacts with and ammoniates the acidulated phosphate rock. Many nitrogen solutions are commercially available. Preferred nitrogen solutions are ammonia-ammonium nitrate; urea-ammonium nitrate; ammonia-urea; ammonia-ammonium nitrate-urea.

The amount of nitrogen in the final slurry fertilizer composition is generally at least 1% by weight and more generally within the range of from about 3% to about 22% by weight. Because of the lower cost of ammonia as a source of nitrogen, as much of the nitrogen content of the fertilizer as is practical is supplied by ammonia nitrogen.

A suspending agent is also preferably used in the slurry of the present invention. Attapulgite and swelling type bentonite, and mixtures of these materials, are preferred suspending agents. Other suspending agents, such as, inter alia, starches, gums, carboxmethylcellulose, etc., may, however, be used. The bentonite used must be a swelling type. The attapulgite clay and/or bentonite are preferably pregelled. The suspending agent is generally used in amount of from 0.1 to 6% by weight of the resulting slurry fertilizer. In general, the amount of clay used varies inversely with the plant nutrient content of the slurry.

Other materials, some of which may supply one of more plant nutrients may also be present in the slurry fertilizer compositions of this invention.

The plant nutrient ingredients may be admixed in any order and in amounts to produce the desired fertilized composition. It is, however, specifically preferred to add the potash ingredient along iwth the acidulated phosphate rock to the nitrogen-containing liquid or after adding the acidulated phosphate rock to the nitrogen-containing liquid.

As hereinbefore set forth, ammonia is the least expensive source of plant nutrient nitrogen. Triple superphosphate is frequently ammoniated when preparing fertilizer. In general, when triple superphosphate is ammoniated, about 3.5 lbs. of ammonia per unit of $P_2O_5$ (a unit of $P_2O_5$ is 20 pounds) is the normal ammonia capacity of triple superphosphate, with 4.0 lbs. of $NH_3$ being about the maximum. It has, however, now been discovered that when triple superphosphate fines are ammoniated in an aqueous slurry that more than about 4.3, generally about 5 pounds of ammonia per unit of $P_2O_5$, is taken up by the triple superphosphate. This is of utmost significance because of the lower cost of ammonia as a nitrogen plant nutrient source.

In the preferred method of preparation of the slurry fertilizer, pregelled clay (bentonite and/or attapulgite) or other suitable suspending agent, is admixed with a nitrogen-containing liquid, in amount to produce the desired final slurry fertilizer composition. Ammonia is preferably utilized to as great an extent as practicably possible because of its lower cost. The final slurry fertilizer composition is, however, preferably not pressured and, therefore, a amount of ammonia used is preferably in amount to substantially completely react with an ammoniate the triple superphospahte to produce a substantially neutral slurry fertilizer. The pH of the final slurry is preferably within the range of from about 6.5 to about 7.5.

The suspending agent is preferably first admixed with aqua ammonia and the supplemented nitrogen is then added as a nitrogen solution. The supplemental nitrogen solution is preferably a urea solution or an ammonium nitrate solution or an ammonium nitrate-urea solution. The nitrogen solution may also provide ammonia, as hereinbefore set forth. The triple superphosphate fines are then added to the ammonia-containing solution in an amount to provide the desired $P_2O_5$ content to the final slurry fertilizer composition. By adding the triple superphosphate to the ammonia-containing solution, a non-acid pH, that is a pH above 7.0, may readily be maintained, which minimizes corrosion problems.

The nitrogen-containing liquid and the triple superphosphate are admixed to provide a relatively uniform slurry of ammoniated triple superphosphate and the potash ingredient is preferably subsequently added. The potash ingredient, preferably KCl, may be added simultaneously with the triple superphosphate; however, it is preferable not to add it before the triple superphosphate which could result in the formation of undesirable large potassium nitrate crystals. Preferably, the potash salt is added after the triple superphosphate is admixed with the nitrogen-containing liquid because this delays the formation of the undesirable potassium nitrate crystals.

The ammoniation of triple superphosphate is exothermic, causing the temperature of the slurry during admixing to rise, but the subsequent endothermic solution of KCl somewhat offsets this. When desired, the slurry of triple superphosphate may be cooled before adding the potash ingredient to minimize $KNO_3$ formation. During the introduction of dry solids to the mixing zone, it is generally advantageous to use both agitation and recycle to avoid formation of lumps.

Trace elements may also be added to the admixture and may be present as chelated compounds, soluble compounds, or insoluble compounds in finely divided form. The trace elements required for good plant growth are well known and include, inter alia, iron, magnesium, manganese, boron, zinc, etc.

It is also within the scope of the present invention to add surface active agents to the admixture to help to maintain the suspension or to more readily disperse the solid phase throughout the liquid phase. The surface active agents are preferably of the non-foaming type such as, inter alia, aryl alkyl sulfonates.

Slurry fertilizers containing ammoniated triple superphosphate exhibit a thixotropic effect. That is, the slurries are quite stiff when permitted to stand quiescent for extended periods, for example over 8 hours. However, when thoroughly stirred, they become quite fluid and the more rapidly they are stirred, the lower the viscosity becomes. Attapulgite clay also imparts this quality of thixotropy to slurry fertilizers.

In order to give a fuller understanding to the invention, but with no intention to be limited thereto, the following specific examples are given.

*Example I*

A sample of $-35$ mesh triple supersphosphate, $-28$ mesh agricultural grade (60% $K_2O$) KCl and pregelled attapulgite clay were added to anhydrous ammonia and agitated in a closed tank to prevent loss of ammonia for about 15 minutes. The ingredients were used in amount to provide a final fertilizer slurry having the following analysis:

TABLE I

| | Percent |
|---|---|
| N | 27.6 |
| $P_2O_5$ | 17.8 |
| $K_2O$ | 17.4 |

*Example II*

The slurry fertilizer compositions listed in Table II were prepared as follows:

Dry attapulgite clay in amount of 1% by weight of the final slurry fertilizer composition was mixed in a large mixing tank with 9 times its weight of water to pregel the clay. Aqua ammonia (commercial grade—26% $NH_3$) was then added to the tank in amount to ammoniate the triple superphosphate and give a substantially neutral pH (about 6.5 to about 7.0) in the final fertilizer slurry composition. The balance of the water to be present in the final slurry composition was then added. A commercial non-pressure urea-ammonium nitrate solution containing 44.3% ammonium nitrate, 35.4% urea and 20.3% water was then added to provide the supplemental nitrogen in the amount required, when required, to bring the nitrogen content up to the amount desired in the final slurry fertilizer composition. This nitrogen solution contains 32% total nitrogen.

Triple superphosphate fines (85 to 90% $-35$ mesh) were then added in amount to produce the desired $P_2O_5$ content in the final slurry composition. Muriate of potash fines ($-28$ mesh) were subsequently added in amount to produce the desired $K_2O$ content in the final slurry fertilizer composition.

The ingredients were continuously admixed as the materials were added to the mixing tank by a turbine-type agitator with a peripheral velocity of 600–700 feet per minute. Mixing was further effected by taking a slurry off the bottom of the tank and recycling it with a centrifugal pump to the top of the tank. The recycle rate was adjusted to turn over the tank valume every 5–7 minutes against a back pressure of 20–25 p.s.i.g.

TABLE II

| $N$-$P_2O_5$-$K_2O$ ratio: | Formula |
|---|---|
| 1–1–1 | 10–10–10 |
| 1–2–1 | 7–14–7 |
| 1–2–2 | 7–14–14 |
| 1–2–3 | 6–12–18 |
| 1–3–1 | 6–18–6 |
| 1–3–2 | 5–15–10 |
| 1–3–3 | 5–15–15 |
| 1–4–2 | 4–16–8 |
| 1–4–4 | 3–12–12 |
| 2–1–0 | 20–10–0 |
| 2–1–1 | 16–8–8 |
| 2–2–1 | 10–10–5 |

Other slurry fertilizer compositions using potassium sulfate instead of potassium chloride were also formulated. Slurry fertilizer compositions using ammonia-urea and ammonia-ammonium nitrate nitrogen solutions were also prepared.

Each of these slurry fertilizer compositions may readily be used in slurry fertilizer application equipment.

The description of the invention utilized specific reference to certain details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

We claim:

1. A fertilizer composition comprising a thixotropic slurry of ammoniated, solid, finely divided, acidulated phosphate rock selected from the group consisting of ammoniated superphosphate, ammoniated triple superphosphate, ammoniated nitric superphosphate and mixtures thereof in an aqueous solution containing a nitrogen plant nutrient selected from the group consisting of ammonia, urea, ammonium nitrate and mixtures thereof, said ammoniated, acidulated phosphate rock containing from about 4.5 to about 5 pounds of ammonia nitrogen per unit of $P_2O_5$, said phosphate rock being present in amount of at least 5% by weight of said slurry fertilizer composition, and said nitrogen being present in an amount of at least 1% by weight of said slurry fertilizer composition.

2. The fertilizer composition of claim 1 wherein said composition contains at least 1% by weight of muriate of potash.

3. The fertilizer composition of claim 1 wherein said composition contains at least 1% by weight of potassium sulfate.

References Cited by the Examiner

UNITED STATES PATENTS

| | | | |
|---|---|---|---|
| 1,948,454 | 2/1934 | Burdick | 71—43 |
| 1,948,520 | 2/1934 | Harvey | 71—43 |
| 2,067,931 | 1/1937 | Kniskern et al. | 71—43 |
| 2,077,171 | 4/1937 | Harvey et al. | 71—43 |
| 2,869,998 | 1/1959 | Vierling | 71—43 |
| 2,976,140 | 3/1961 | Carothers et al. | 71—43 |
| 2,999,015 | 9/1961 | Mortenson et al. | 71—43 |
| 3,019,099 | 1/1962 | Walters | 71—43 |
| 3,022,153 | 2/1962 | Miller | 71—1 |
| 3,096,170 | 7/1963 | Newsome | 71—1 |

DONALL H. SYLVESTER, *Primary Examiner.*

ANTHONY SCIAMANNA, *Examiner.*